United States Patent
Lee et al.

(10) Patent No.: US 11,768,108 B2
(45) Date of Patent: Sep. 26, 2023

(54) OPTICAL FILTER AND SPECTROMETER INCLUDING THE OPTICAL FILTER

(71) Applicant: SAMSUNG ELECTRONICS CO., LTD., Suwon-si (KR)

(72) Inventors: Jaesoong Lee, Suwon-si (KR); Yeonsang Park, Seoul (KR); Hyochul Kim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 265 days.

(21) Appl. No.: 16/952,512

(22) Filed: Nov. 19, 2020

(65) Prior Publication Data
US 2021/0148755 A1     May 20, 2021

(30) Foreign Application Priority Data

Nov. 19, 2019 (KR) .................. 10-2019-0148796

(51) Int. Cl.
*G01J 3/02* (2006.01)
*G02B 5/22* (2006.01)

(52) U.S. Cl.
CPC .............. *G01J 3/0229* (2013.01); *G02B 5/22* (2013.01); *G02B 2207/101* (2013.01)

(58) Field of Classification Search
None
See application file for complete search history.

(56) References Cited

U.S. PATENT DOCUMENTS

| | | | |
|---|---|---|---|
| 6,076,932 A * | 6/2000 | Uchida | G02B 5/22 359/585 |
| 7,545,549 B2 | 6/2009 | Tomaru | |
| 9,939,587 B2 | 4/2018 | Han et al. | |
| 10,012,541 B2 * | 7/2018 | Langner | G01J 3/0256 |
| 2004/0134879 A1 * | 7/2004 | Kochergin | G02B 6/1225 216/24 |
| 2006/0126480 A1 * | 6/2006 | Lindvold | G11B 7/2532 |

(Continued)

FOREIGN PATENT DOCUMENTS

| | | |
|---|---|---|
| JP | 2007017953 A | 1/2007 |
| JP | 2016061815 A | 4/2016 |

(Continued)

OTHER PUBLICATIONS

Pisarek, M. et al. "Titanium (IV) oxide nanotubes in design of active SERS substrates for high sensitivity analytical applications: Effect of geometrical factors in nanotubes and in Ag-n deposits." Raman Spectroscopy (2018): 37-54 (Year: 2018).*

(Continued)

*Primary Examiner* — Tarifur R Chowdhury
*Assistant Examiner* — Roberto Fabian, Jr.
(74) *Attorney, Agent, or Firm* — Sughrue Mion, PLLC

(57) ABSTRACT

The disclosure provides an optical filter element including a plurality of nano-columns separated from each other in a horizontal direction and extended in a vertical direction, and each of the plurality of nano-columns includes a first material layer having an first extinction coefficient and second material layers having second extinction coefficients different from the first extinction coefficient of the first material layer and a spectrometer including the same.

29 Claims, 14 Drawing Sheets

(56) References Cited

U.S. PATENT DOCUMENTS

2010/0085566 A1    4/2010  Cunningham
2018/0274977 A1*  9/2018  Baik .......................... G01J 3/18

FOREIGN PATENT DOCUMENTS

KR        20170026093 A  *  3/2017
KR      1020170026093 A     3/2017

OTHER PUBLICATIONS

Hackett, Lisa P., et al. "Plasmonic metal-insulator-metal capped polymer nanopillars for SERS analysis of protein-protein interactions." The Journal of Physical Chemistry C 122.11 (2018): 6255-6266 (Year: 2018).*

TiO2 membrane high-contrast grating reflectors for vertical-cavity light-emitters in the visible wavelength regime. Journal of Vacuum Science & Technology B, Nanotechnology and Microelectronics: Materials, Processing, Measurement, and Phenomena 33.5 (2015): 050603 (Year: 2015).*

Pisarek, M., et al., "Titanium (IV) Oxide Nanotubes in Design of Active SERS Substrates for High Sensitivity Analytical Applications: Effect of Geometrical Factors in Nanotubes and in Ag-n Deposits", IntechOpen, Raman Spectroscopy, 2018, pp. 37-54 (Intech Open).

* cited by examiner

OPTICAL FILTER AND SPECTROMETER INCLUDING THE OPTICAL FILTER

CROSS-REFERENCE TO RELATED APPLICATION

This application is based on and claims priority from Korean Patent Application No. 10-2019-0148796, filed on Nov. 19, 2019, in the Korean Intellectual Property Office, the disclosure of which is incorporated herein in its entirety by reference.

BACKGROUND

1. Field

The disclosure relates to optical filters and spectrometers including the same.

2. Description of Related Art

Related art spectrometers, which are important optical instruments in the field of optics, include various optical elements, and thus, are bulky and heavy. Recently, as miniaturization of spectrometers is required, research for simultaneously implementing integrated circuits and optical devices on one semiconductor chip has been conducted. In particular, since a spectrometer having an on-chip structure is advantageous in miniaturization by simultaneously implementing an integrated circuit and an optical device on one semiconductor chip, research on a spectrometer having an on-chip structure has been conducted.

The on-chip structure may include a resonator, and in some cases, in order to increase the performance of a spectrometer having the on-chip structure, a high refractive index material is applied to the resonator. However, since the high refractive index material absorbs light in a relatively high manner, the light absorption of the high refractive index material may be a major cause of the performance degradation of a general spectrometer. Therefore, there may be a limitation in applying the kind of high refractive index material to a spectrometer.

SUMMARY

Provided are ultra-small spectrometers having a wideband spectral range.

Additional aspects will be set forth in part in the description which follows and, in part, will be apparent from the description, or may be learned by practice of the presented embodiments of the disclosure.

According to an aspect of the disclosure, there is provided an optical filter element comprising: a plurality of nano-columns separated from each other in a horizontal direction, wherein the plurality of nano-columns extend in a vertical direction, and each of the plurality of nano-columns comprises: a first material layer having a first coefficient, and second material layers having a second coefficient different from the first coefficient of the first material layer.

Each of the second material layers may be provided on upper and lower portions of the first material layer.

A silicon oxide layer may be provided between the first material layer and the second material layer.

The first coefficient of the first material layer may be less than the second coefficient of the second material layers.

The second coefficient of the second material layers may be greater than 0.1.

The second coefficient of the second material layers may be an extinction coefficient with respect to light in a wavelength range of 300 nm to 1000 nm.

The first material layer may have a refractive index less than that of the second material layers.

The second material layers may comprise one of silicon Si or gallium arsenide GaAs.

The first material layer mat comprise titanium oxide $TiO_2$.

The first material layer may have a first height greater than a second height of the second material layers.

The second material layers may have a height in a range of 10 nm to 20 nm.

The first material layer may have a height in a range of 50 nm to 200 nm.

A resonant wavelength of the optical filter element may be based at least one of pitch, thickness, and duty cycle of the plurality of nano-columns.

The plurality of nano-columns may be periodically arranged.

The optical filter element may further comprise a filling layer that is provided to surround the plurality of nano-columns and has a first refractive index different from a second refractive of the plurality of nano-columns.

The optical filter element may further comprise a first reflective layer on the plurality of nano-columns; and a second reflective layer under the plurality of nano-columns.

Each of the first reflective layer and the second reflective layer may comprise a stack-structure in which at least two material layers having different refractive indices from each other are alternately stacked.

The first coefficient may be an extinction coefficient representing light absorption characteristic of the first material layer, and the second coefficient may be an extinction coefficient representing light absorption characteristics of the second material layers.

According to another aspect of the disclosure, there is provided a spectrometer comprising: a plurality of optical filter elements having different resonant wavelengths from each other; and a sensor configured to receive light transmitted through the plurality of optical filter elements, wherein each of the plurality optical filter elements comprises: a plurality of nano-columns that are separated from each other in a horizontal direction, wherein the plurality of nano-columns extend in a vertical direction, and wherein each of the plurality of nano-columns comprises a first material layer having a first coefficient and second material layers having second coefficients different from the first coefficient of the first material layer.

The first coefficient may be an extinction coefficient representing light absorption characteristic of the first material layer, and the second coefficient may be an extinction coefficient representing light absorption characteristics of the second material layers.

The plurality of optical filters may be arranged in a two-dimensional (2D) array.

Each of the second material layers may be provided on upper and lower portions of the first material layer.

The second coefficient of the second material layer may be greater than the first coefficient of the first material layer.

The second coefficient of the second material layers may be greater than 0.1.

The spectrometer may further comprise: a first reflective layer provided on the plurality of nano-columns; and a second reflective layer provided under the plurality of nano-columns.

Each of the plurality of optical filter elements may further comprise a filling layer that is provided to surround the plurality of nano-columns and has a first refractive index different from than a second refractive index of the plurality of nano-columns.

The sensor may comprise an image sensor or a photodiode.

According to another aspect of the disclosure, there is provided a filter apparatus comprising: a base layer; a first refraction layer provided on the base layer, the first refraction layer having a first extinction coefficient; a second refraction layer provided on the first refraction layer, the second refraction layer having a second extinction coefficient different from the first extinction coefficient; and a third refraction layer provided on the second refraction layer, the third refraction layer having a third extinction coefficient different from the first extinction coefficient.

The second extinction coefficient may be less than the first or the third extinction coefficient.

The base layer may be a sensor layer.

BRIEF DESCRIPTION OF THE DRAWINGS

The above and other aspects, features, and advantages of certain example embodiments of the disclosure will be more apparent from the following description taken in conjunction with the accompanying drawings, in which.

DETAILED DESCRIPTION

Figure 1:
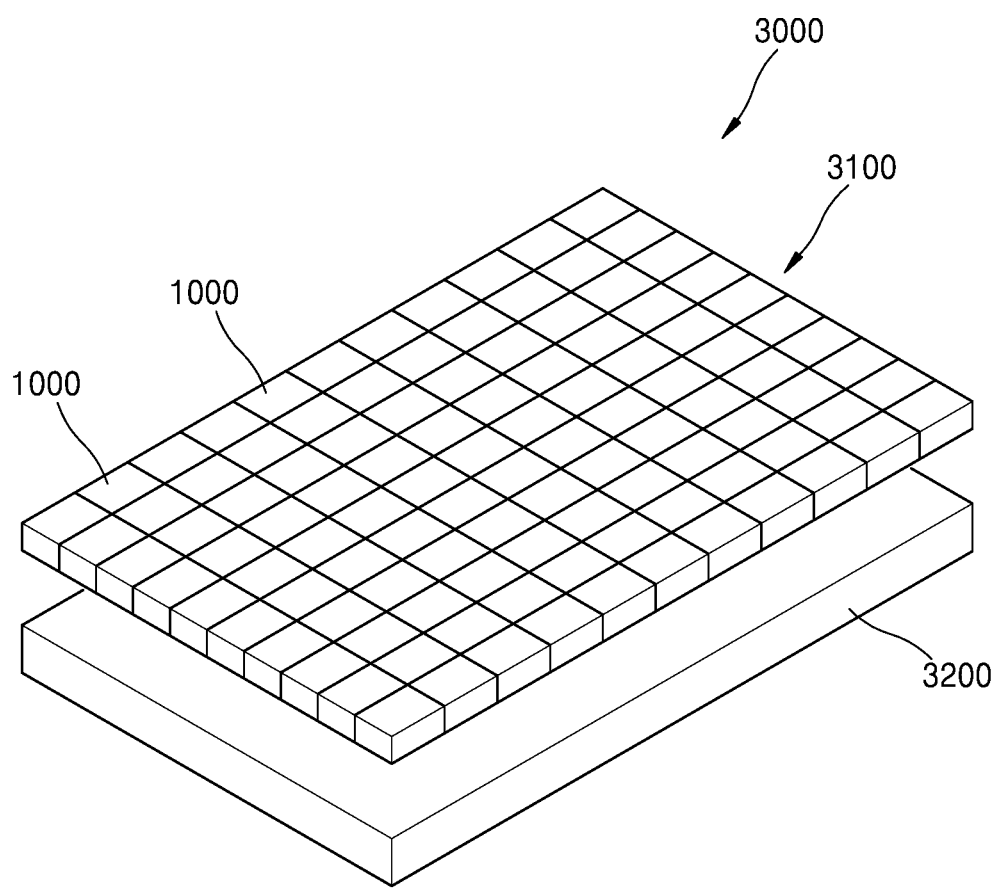
FIG. 1 is a perspective view schematically showing a spectrometer according to an example embodiment.

Reference will now be made in detail to embodiments, examples of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, an optical filter and a spectrometer including the same according to various example embodiments will be described in detail with reference to the accompanying drawings. In the drawings, like reference numerals refer to like elements, and the size or thickness of each element may be exaggerated for clarity.

It will be understood that, although the terms 'first', 'second', etc. may be used herein to describe various elements, these elements should not be limited by these terms. These terms are only used to distinguish one element from another. The optical filter and the spectrometer including the same may be implemented in various different forms and are not limited to the example embodiments described herein.

It should be understood that, when a part "comprises" or "includes" an element in the specification, unless otherwise defined, it is not excluding other elements but may further include other elements.

Figure 2:
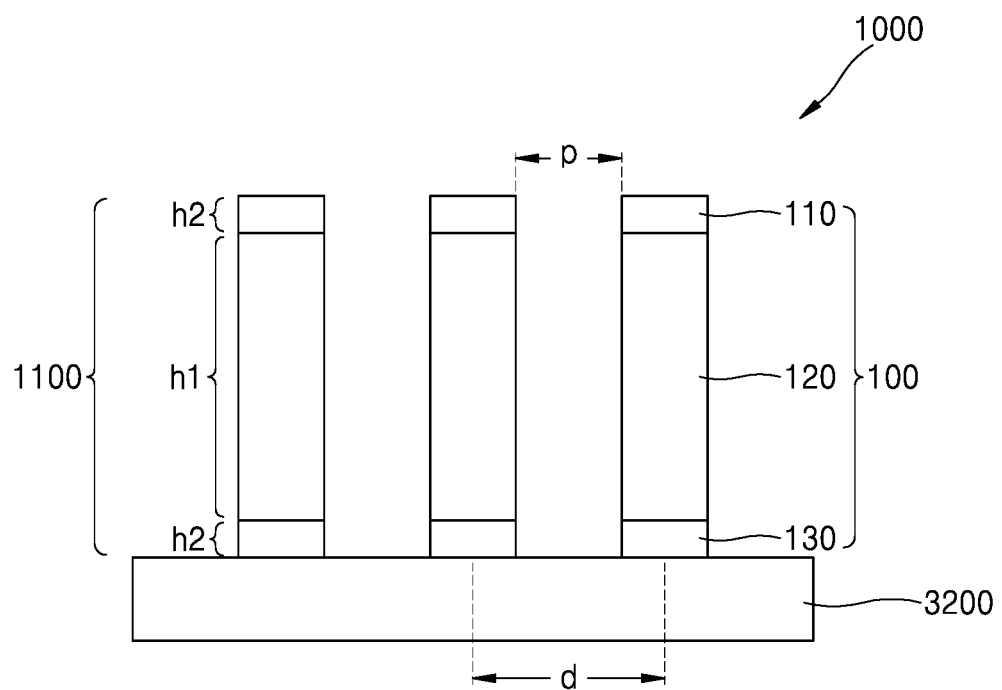
FIG. 2 is a lateral cross-sectional view schematically illustrating an optical filter element according to an embodiment.
Figure 3:
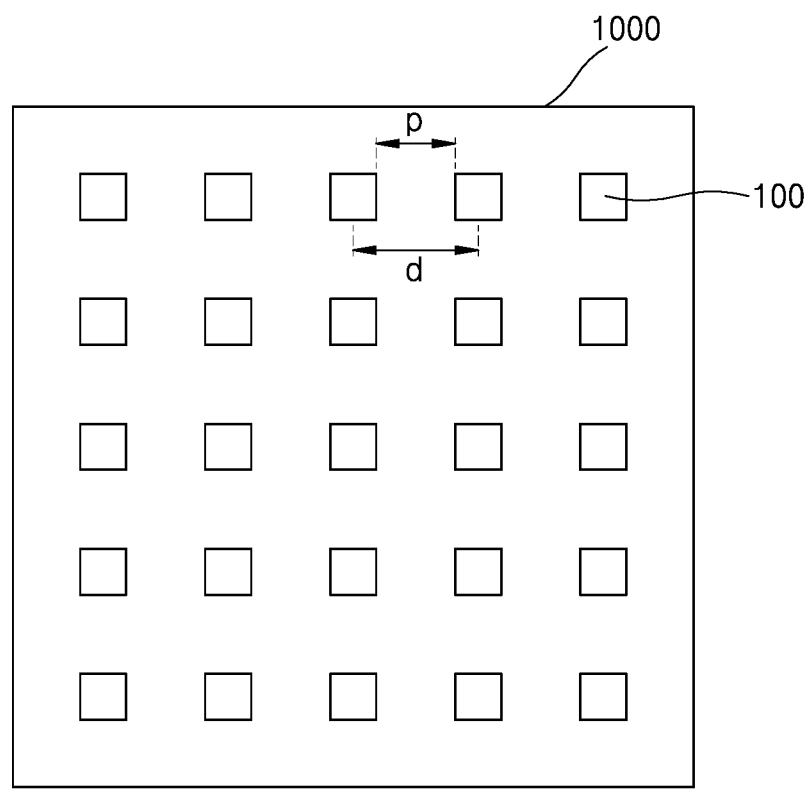
FIG. 3 is a plan view schematically illustrating the optical filter element of FIG. 2.
Figure 4:
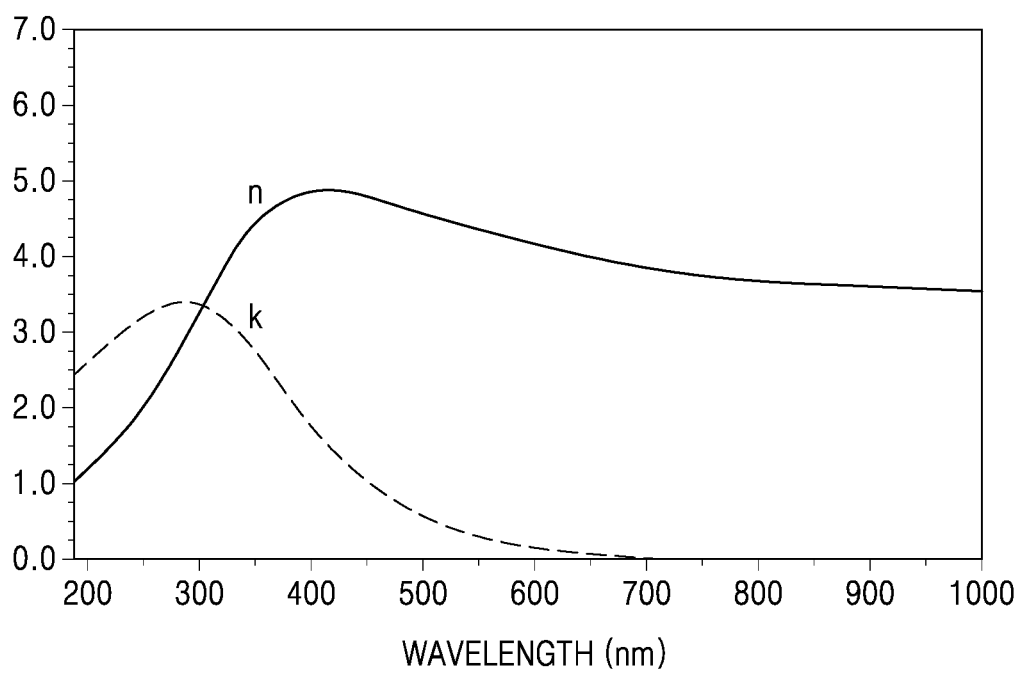
FIG. 4 is a graph schematically showing characteristics of a second material layer.
Figure 5:
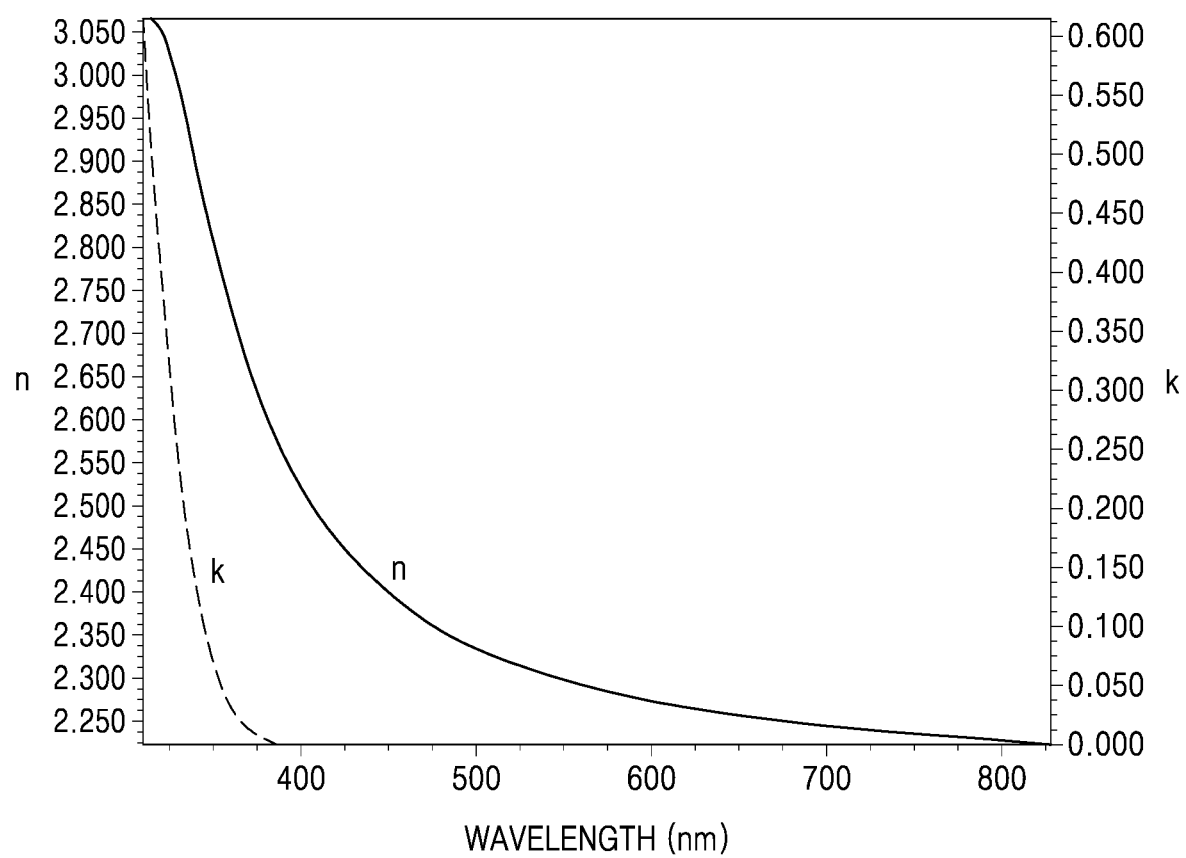
FIG. 5 is a graph schematically showing characteristics of a first material layer.

FIG. 1 is a perspective view schematically showing a spectrometer 3000 according to an example embodiment. FIG. 2 is a lateral cross-sectional view schematically illustrating an optical filter element 1000 according to an example embodiment. FIG. 3 is a plan view schematically illustrating the optical filter element 1000 of FIG. 2. FIG. 4 is a graph schematically showing characteristics of second material layers. FIG. 5 is a graph schematically showing characteristics of a first material layer.

Referring to FIG. 1, the spectrometer 3000 may include a sensor 3200 and an optical filter 3100 on the sensor 3200. The optical filter 3100 may include a plurality of optical filter elements 1000 having resonant wavelengths different from each other. However, the disclosure is not limited thereto, and some of the optical filter elements 1000 may be provided to have the same resonant wavelength according to other example embodiments. Light may be incident on the optical filter 3100 from the outside. The incident light may be transmitted through the optical filter 3100 after resonating inside the plurality of optical filter elements 1000. The sensor 3200 may receive light transmitted through the optical filter 3100.

The sensor 3200 may receive light transmitted through the optical filter 3100 and may convert the light into an electrical signal. Light incident on the optical filter 3100 is transmitted through the plurality of optical filter elements 1000, and light including different center-wavelengths from each other transmitted through the plurality of optical filter elements 1000 reaches pixels of the sensor 3200. The sensor 3200 converts light incident on the pixels into an electrical signal. The sensor 3200 may include, for example, an image sensor, such as a charge coupled device (CCD), a complementary metal-oxide semiconductor (CMOS) image sensor, or a photodiode.

The optical filter 3100 may include a plurality of optical filter elements 1000 arranged in a two-dimensional (2D) array. For example, the plurality of optical filter elements 1000 may be arranged in the form of a 2D array on the sensor 3200. However, this is an example, and it is also possible that the plurality of optical filter elements 1000 may be arranged in a one-dimensional array.

Referring to FIGS. 2 and 3, each of the plurality of optical filter elements 1000 may include a plurality of nano-columns 100 that are separated from each other in a horizontal direction and extend in a vertical direction. Each of the plurality of nano-columns 100 may have various shapes, such as a cylinder shape, a square column shape, a triangular column shape, etc. The plurality of nano-columns 100 may be periodically arranged with a duty cycle of a first distance d with respect to each other in a horizontal direction. However, the disclosure is not limited thereto, and the plurality of nano-columns 100 may be irregularly arranged according to another example embodiment. Also, as illustrated in FIG. 3, the plurality of nano-columns 100 may be separately arranged from each other with a pitch of a second distance p in the horizontal direction. In FIG. 2, it is depicted that the plurality of nano-columns 100 contact the sensor 3200, but the disclosure is not limited thereto. For example, according to another example embodiment, a gap may be formed between the plurality of nano-columns 100 and the sensor 3200, and thus, the plurality of nano-columns 100 and the sensor 3200 may be separated in the vertical direction.

The plurality of nano-columns 100 may form a resonance layer 1100. Light incident from the outside may resonate between upper and lower surfaces of each of the plurality of nano-columns 100. At this point, each of resonant wavelengths of the plurality of nano-columns 100 may be determined by at least one of pitch, thickness, and duty cycle of the plurality of nano-columns 100. In other words, a resonant wavelength of the optical filter element 1000 may be determined according to at least one of the pitch, thickness, and duty cycle of the plurality of nano-columns 100.

Each of the nano-columns 100 may include a first material layer 120 having an extinction coefficient k and second material layers 110 and 130 having extinction coefficients k different from that of the first material layer 120. The extinction coefficient k refers to a measurement of the absorption of light in a medium, i.e., at a particular wavelength. The extinction coefficient k of the first material layer 120 may be a first extinction coefficient k, and the extinction coefficient k of the second material layer 110 may be a second extinction coefficient k. The second material layers 110 and 130 may include an upper second material layer 110 and a lower second material layer 130. The upper and lower second material layers 110 and 130 respectively may be provided on upper and lower portions of the first material layer 120. For example, the upper second material layer 110 may contact the upper surface of the first material layer 120, and the lower second material layer 130 may contact the lower surface of the first material layer 120. A silicon oxide layer may further be provided between the upper second material layer 110 and the first material layer 120. According to an example embodiment, the forming of the upper second material layer 110 directly on the upper surface of the first material layer 120 may be difficult, and in such a case, the silicon oxide layer may facilitate the forming of the upper second material layer 110 on the upper surface of the first material layer 120. All of the first material layer 120 and the upper and lower second material layers 110 and 130 may be formed by extending in the vertical direction. For example, the first material layer 120 may have a first height h1 extending in the vertical direction. Also, the upper and lower second material layers 110 and 130 may have a second height h2 extending in the vertical direction. The first material layer 120 has a height h1 that is greater than the second height h2 of the upper and lower second material layers 110 and 130. For example, the first height h1 of the first material layer 120 may be in a range of 50 nm to 200 nm. Also, the second height h2 of the upper and lower second material layers 110 and 130 may be in a range of 10 nm to 20 nm.

The extinction coefficient of the first material layer 120 may be less than the extinction coefficient of the upper and lower second material layers 110 and 130. For example, as shown in FIG. 4, the absorption coefficient k with respect to light in a wavelength range of 300 nm to 700 nm of the upper and lower second material layers 110 and 130 may be greater than 0.1. However, the disclosure is not limited thereto, and according to another example embodiment, the absorption coefficient k with respect to light in the wavelength range of 300 nm to 1000 nm of the upper and lower second material layers 110 and 130 may be greater than 0.1. Also, the refractive index n with respect to light in the wavelength range of 300 nm to 1000 nm of the upper and lower second material layers 110 and 130 may be 3 or more. In this way, the upper and lower second material layers 110 and 130 may have a relatively high refractive index n and a high absorption coefficient k with respect to light in the wavelength range of 300 nm to 1000 nm. For example, the upper and lower second material layers 110 and 130 may include any one of silicon (Si) and gallium arsenide (GaAs). On the other hand, as shown in FIG. 5, the absorption coefficient k with respect to light in the wavelength range of 300 nm to 1000 nm of the first material layer 120 may be relatively closer to zero than the absorption coefficient k of the upper and lower second material layers 110 and 130. Accordingly, the first material layer 120 may substantially and hardly absorb light in the wavelength range of 300 nm to 1000 nm. Furthermore, the refractive index (n of FIG. 5) of the first material layer 120 may be less than the refractive index (n of FIG. 4) of the upper and lower second material layers 110 and 130. For example, as described above, the refractive index with respect to light in the wavelength range of 300 nm to 1000 nm of the upper and lower second material layers 110 and 130 is 3 or more, while the refractive index with respect to light of the 300 nm wavelength of the first material layer 120 is about 3 and the refractive index with respect to light of a wavelength greater than 300 nm is less than 3. For example, the first material layer 120 may include titanium oxide ($TiO_2$).

Referring back to FIG. 2, each of the plurality of nano-columns 100 may include the first material layer 120 having a relatively low extinction coefficient k (k in FIG. 5) between the upper and lower second material layers 110 and 130 having a relatively high absorption coefficient k (k in FIG. 4). For example, the first material layer 120 may have an absorption coefficient k (k in FIG. 5) with respect to light in a wavelength range of 300 nm to 1000 nm substantially close to zero, and accordingly, the first material layer 120 may hardly absorb light in the wavelength range of 300 nm to 1000 nm Since each of the plurality of nano-columns 100 includes the upper and lower second material layers 110 and 130 that absorb light in the wavelength range of 300 nm to 1000 nm, the plurality of nano-columns 100 may absorb a portion of light in the wavelength range of 300 nm to 1000 nm. Since the optical filter element 1000 includes a plurality of nano-columns 100 that absorb a portion of light in the wavelength range of 300 nm to 1000 nm, the optical filter element 1000 may have a relatively wider spectral range than a case when the optical filter element 1000 includes nano-columns that absorb relatively little or does not absorb light in the wavelength range of 300 nm to 1000 nm Hereinafter, the optical filter element 1000 that may have a broader spectral range than a comparative example as described in detail with reference to FIGS. 6 and 7.

Figure 6:
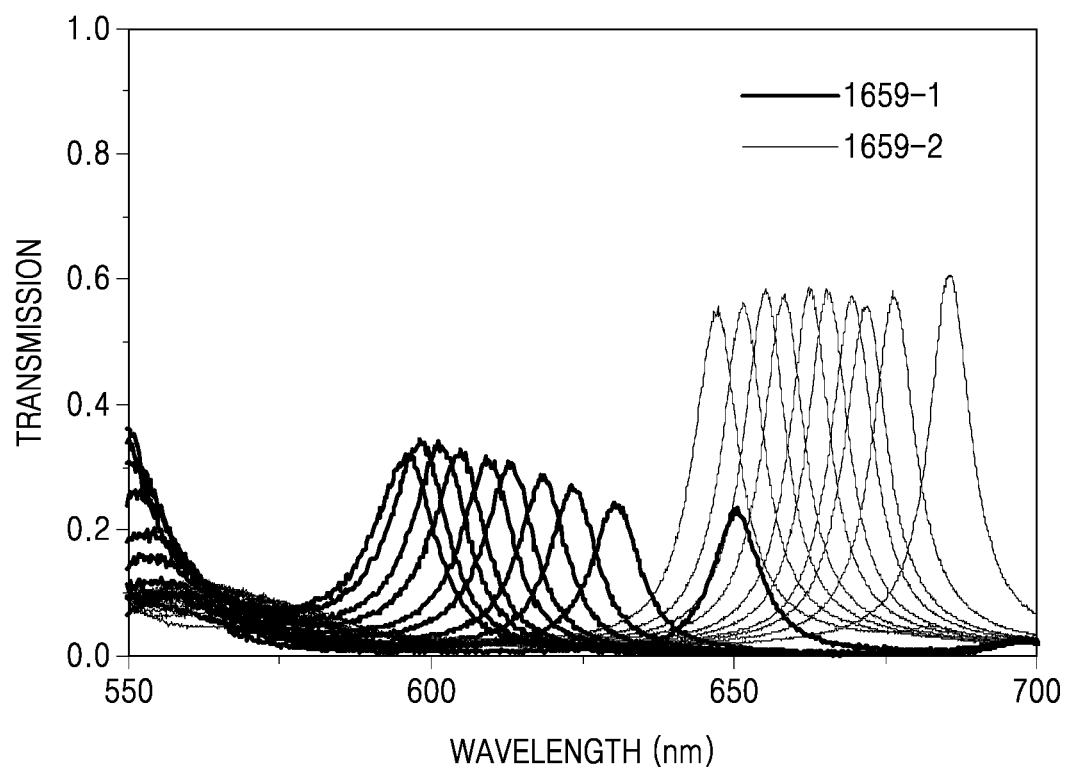
FIG. 6 is a graph showing characteristics of light transmitted through the optical filter element of FIG. 2.
Figure 7:
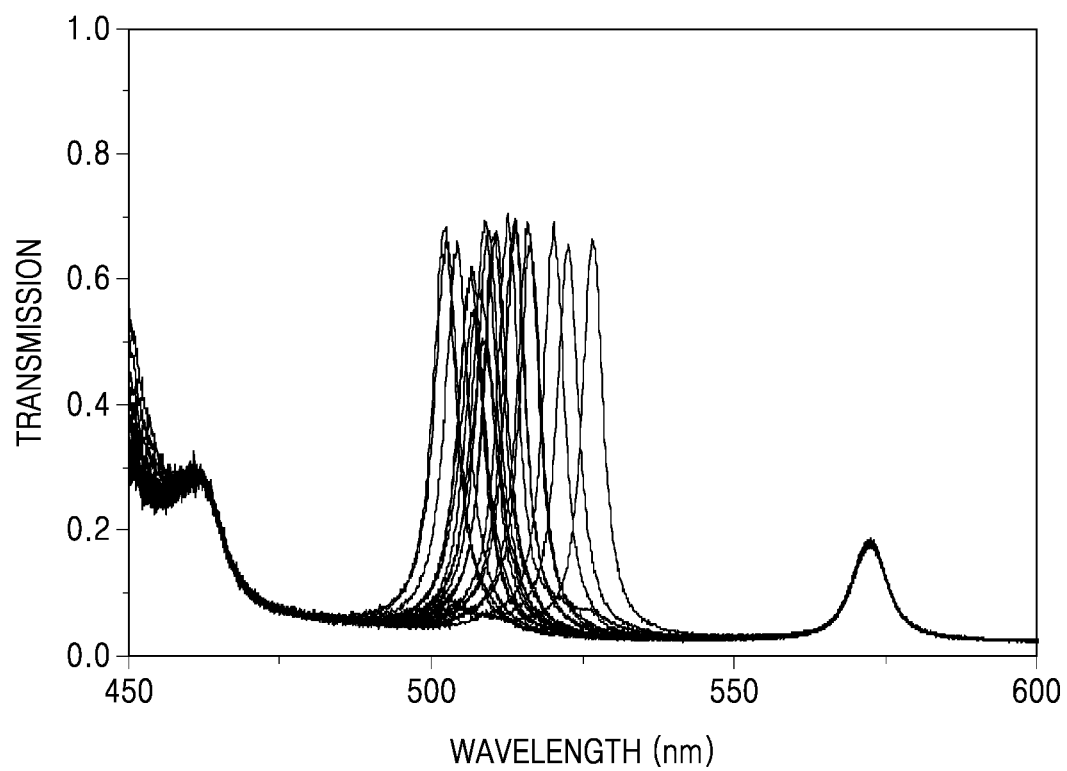
FIG. 7 is a graph showing characteristics of light transmitted through an optical filter element according to a comparative example.

FIG. 6 is a graph showing characteristics of light transmitted through the optical filter element 1000 of FIG. 2. FIG. 7 is a graph showing characteristics of light transmitted through an optical filter element according to a comparative example.

Referring to FIG. 6, the spectral range of the optical filter element 1000 according to a first curve 1659-1 may be about 80 nm, and the spectral range of the optical filter element 1000 according to a second curve 1659-2 may be about 40 nm. The height the plurality of nano-columns 100 of the optical filter element 1000 showing the result of the first curve 1659-1 may be different from the height of the plurality of nano-columns 100 of the optical filter element 1000 showing the result of the second curve 1659-2. However, the disclosure is not limited thereto, and according to another example embodiment, the spectral range of the optical filter element 1000 may be 100 nm or more depending on the precision of a process. Referring to FIG. 7, the spectral range of the optical filter element according to the comparative example may be about 30 nm.

In this way, the spectral range of the optical filter element 1000 according to an embodiment may be wider than that of the optical filter element according to the comparative example. The difference may appear because the optical filter element 1000 includes the upper and lower second material layers 110 and 130 that absorb light in the wavelength range of 300 nm to 1000 nm. In other words, the optical filter element 1000 may include the upper and lower second material layers 110 and 130 having a high refractive index and a high extinction coefficient, thereby having a further wide spectral range.

Figure 8:
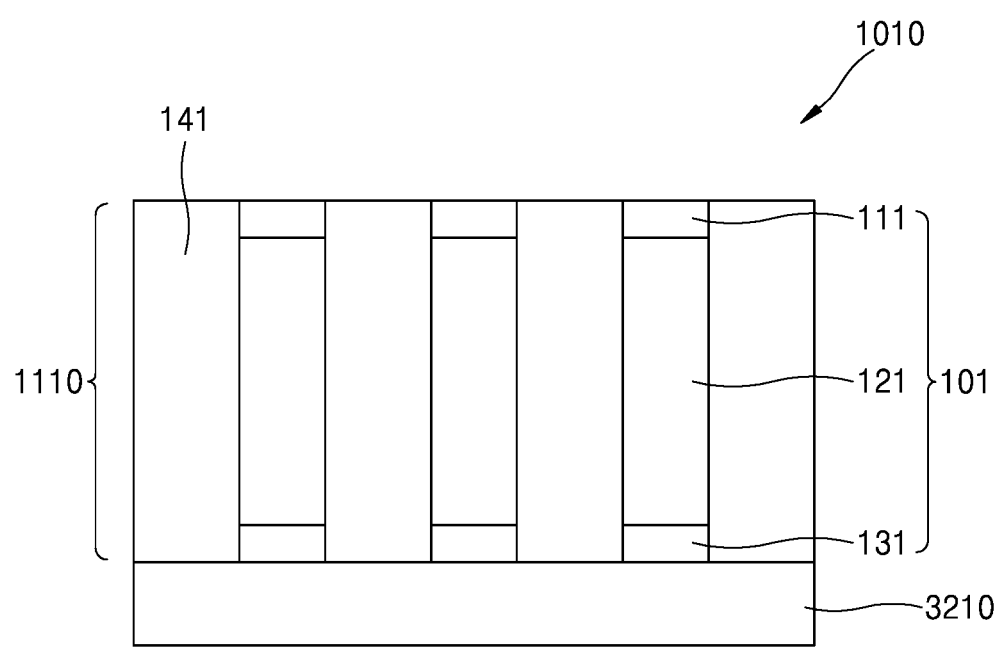
FIG. 8 is a lateral cross-sectional view schematically illustrating an optical filter element according to another example embodiment.

FIG. 8 is a lateral cross-sectional view schematically illustrating an optical filter element 1010 according to another example embodiment.

Referring to FIG. 8, the optical filter element 1010 may be provided on a sensor 3210. The optical filter element 1010 may include a plurality of nano-columns 101 separated from each other in a horizontal direction and extended in a vertical direction. For example, the plurality of nano-columns 101 may be periodically arranged with a duty cycle with respect to each other in the horizontal direction. However, the disclosure is not limited thereto, and according to another example embodiment, the plurality of nano-columns 101 may be irregularly arranged. The plurality of nano-columns 101 may form a resonance layer 1110. A resonant wavelength of each of the plurality of nano-columns 101 may be determined by at least one of pitch, thickness, and duty cycle of the plurality of nano-columns 101. Each of the plurality of nano-columns 101 may include a first material layer 121 having an extinction coefficient and second material layers 111 and 131 having an extinction coefficient different from that of the first material layer 121. The second material layers 111 and 131 may include an upper second material layer 111 and a lower second material layer 131. The upper and lower second material layers 111 and 131 respectively may be provided on upper and lower portions of the first material layer 121. The first material layer 121 may have a height greater than that of the upper and lower second material layers 111 and 131.

Furthermore, the optical filter element 1010 may further include a filling layer 141 that is provided to surround the plurality of nano-columns 101 and has a refractive index different from that of the plurality of nano-columns 101. The filling layer 141 may have a refractive index less than that of the plurality of nano-columns 101. For example, the filling layer 141 may include $SiO_2$, a polymer-based material (SU-8, PMMA), or a hydrogen silsesquioxane (HSQ). However, this is an example, and the filling layer 141 may include various other materials in addition to the above materials.

In FIG. 8, it is depicted that the plurality of nano-columns 101 contact a sensor 3210, but the disclosure is not limited thereto. For example, the filling layer 141 may fill between the plurality of nano-columns 101 and the sensor 3210, and thus, the plurality of nano-columns 101 and the sensor 3210 may be separated in the vertical direction.

Figure 9:
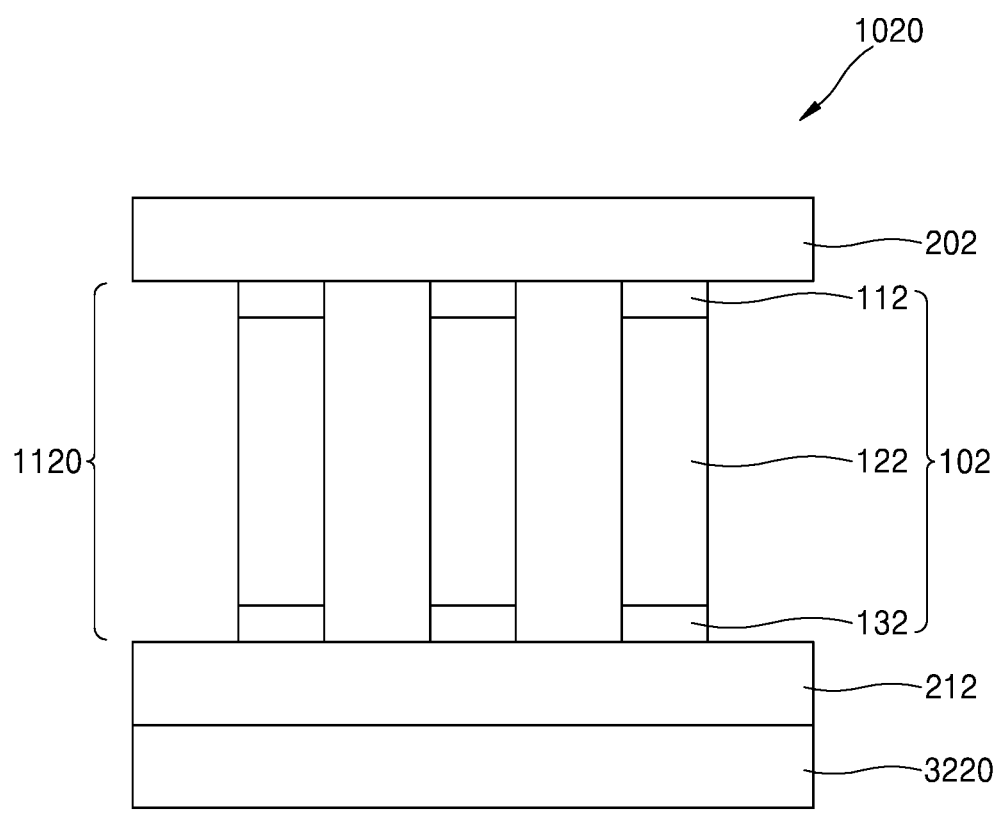
FIG. 9 is a lateral cross-sectional view schematically illustrating an optical filter element according to another example embodiment.
Figure 10:
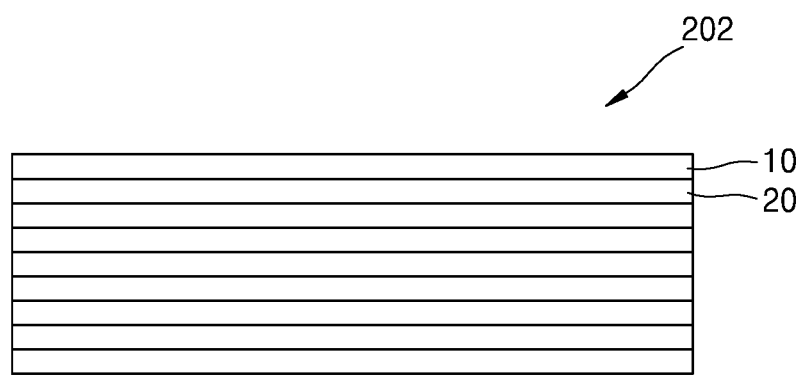
FIG. 10 is a lateral cross-sectional view schematically illustrating the structure of a reflective layer of FIG. 9.

FIG. 9 is a lateral cross-sectional view schematically illustrating an optical filter element 1020 according to another example embodiment. FIG. 10 is a lateral cross-sectional view schematically illustrating the structure of a reflective layer 202 of FIG. 9.

Referring to FIG. 9, the optical filter element 1020 may be provided on a sensor 3220. The optical filter element 1020 may include a plurality of nano-columns 102 separated from each other in a horizontal direction and extended in a vertical direction. For example, the plurality of nano-columns 102 may be periodically arranged with a duty cycle with respect to each other in the horizontal direction. However, the disclosure is not limited thereto, and according to another example embodiment, the plurality of nano-columns 102 may be irregularly arranged. The plurality of nano-columns 102 may form a resonance layer 1120. A resonant wavelength of each of the plurality of nano-columns 102 may be determined by at least one of pitch, thickness, and duty cycle of the plurality of nano-columns 102. Each of the plurality of nano-columns 102 may include a first material layer 122 having an extinction coefficient and second material layers 112 and 132 having extinction coefficients different from that of the first material layer 122. The second material layers 112 and 132 may include an upper second material layer 112 and a lower second material layer 132. The upper and lower second material layers 112 and 132 respectively may be provided on upper and lower portions of the first material layer 122. The first material layer 122 may have a height greater than that of the upper and lower second material layers 112 and 132.

Furthermore, the optical filter element 1020 may further include a first reflective layer 202 on the plurality of nano-columns 102 and a second reflective layer 212 under the plurality of nano-columns 102. Since the first and second reflective layers 202 and 212 have high reflectance, the first and second reflective layers 202 and 212 may further increase a resonance phenomenon of light occurring in the plurality of nano-columns 102. The optical filter element 1020 of FIG. 9 includes both the first reflective layer 202 and the second reflective layer 212, but the disclosure is not limited thereto. For example, the optical filter element 1020 may include only one of the first reflective layer 202 and the second reflective layer 212 according to another example embodiment.

Each of the first reflective layer 202 and the second reflective layer 212 may include a stack-structure in which at least two material layers having different refractive indices from each other are alternately stacked. For example, as shown in FIG. 10, each of the first and second reflective layers 202 and 212 may be a Distributed Bragg Reflector including a stacked structure in which a low refractive index layer 10 having a relatively low refractive index and a high refractive index layer 20 having a relatively high refractive index are alternately stacked. However, the disclosure is not limited thereto, and according to another example embodiment, the first and second reflective layers 202 and 212 may have a stack-structure formed by alternately stacking three material layers having different refractive indices from each other. The reflectance of the first and second reflective layers 202 and 212 may be controlled according to the number and arrangement of material layers included in the first and second reflective layers 202 and 212.

Figure 11:
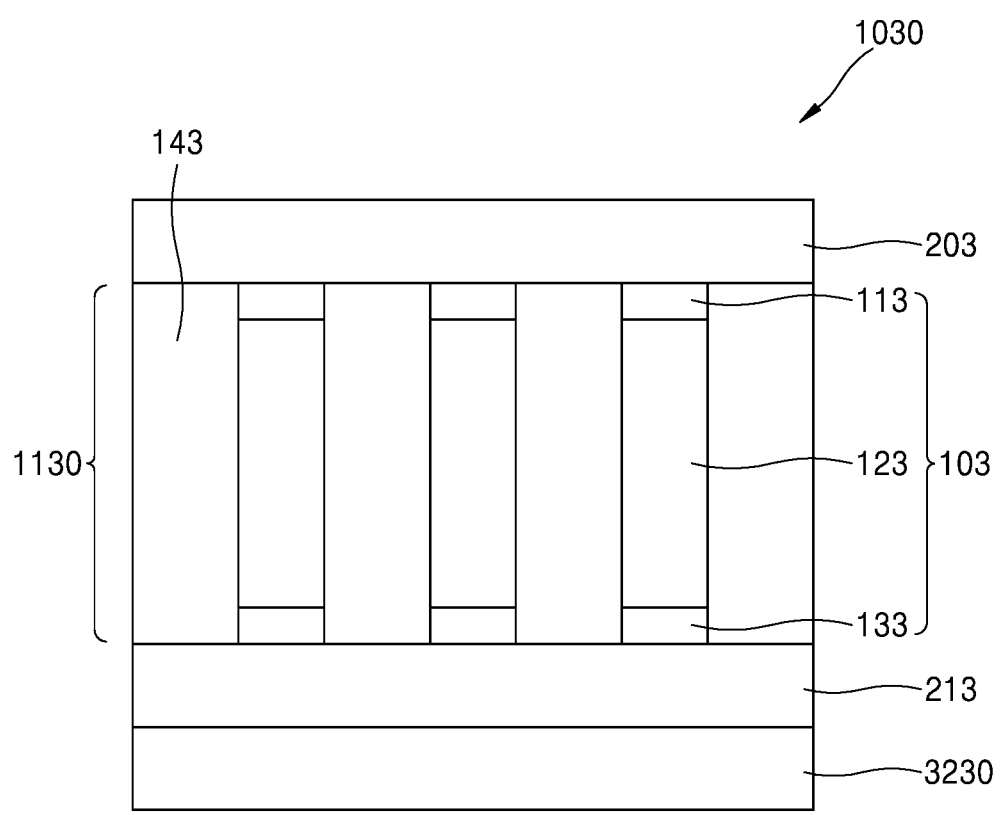
FIG. 11 is a lateral cross-sectional view schematically illustrating an optical filter element according to another example embodiment.

FIG. 11 is a lateral cross-sectional view schematically illustrating an optical filter element 1030 according to another example embodiment.

Referring to FIG. 11, the optical filter element 1030 may be provided on a sensor 3230. The optical filter element 1030 may include a plurality of nano-columns 103 separated from each other in a horizontal direction and extended in a vertical direction. For example, the plurality of nano-columns 103 may be periodically arranged with a duty cycle with respect to each other in the horizontal direction. However, the disclosure is not limited thereto, and according to another example embodiment, the plurality of nano-columns 103 may be irregularly arranged. The plurality of nano-columns 103 may form a resonance layer 1130. A resonant wavelength of each of the plurality of nano-columns 103 may be determined by at least one of pitch, thickness, and duty cycle of the plurality of nano-columns 103. Each of the plurality of nano-columns 103 may include a first material layer 123 having an extinction coefficient and second material layers 113 and 133 having extinction coefficients different from that of the first material layer 123. The second material layers 113 and 133 may include an upper second material layer 113 and a lower second material layer 133. The upper and lower second material layers 113 and 133 respectively may be provided on upper and lower portions of the first material layer 123. The first material layer 123 may have a height greater than that of the upper and lower second material layers 113 and 133.

Furthermore, the optical filter element 1030 may further include a first reflective layer 203 on the plurality of nano-columns 103 and a second reflective layer 213 under the plurality of nano-columns 103.

Also, the optical filter element 1030 may further include a filling layer 143 that is provided between the first reflective layer 203 and the second reflective layer 213 to surround the plurality of nano-columns 103 and has a refractive index different from that of the plurality of nano-columns 103. The filling layer 143 may have a refractive index less than that of the plurality of nano-columns 103. In FIG. 11, it is depicted that the optical filter element 1030 includes both the first reflective layer 203 and the second reflective layer 213, but the disclosure is not limited thereto. For example, the optical filter element 1030 may include only one of the first reflective layer 203 and the second reflective layer 213.

Figure 12:
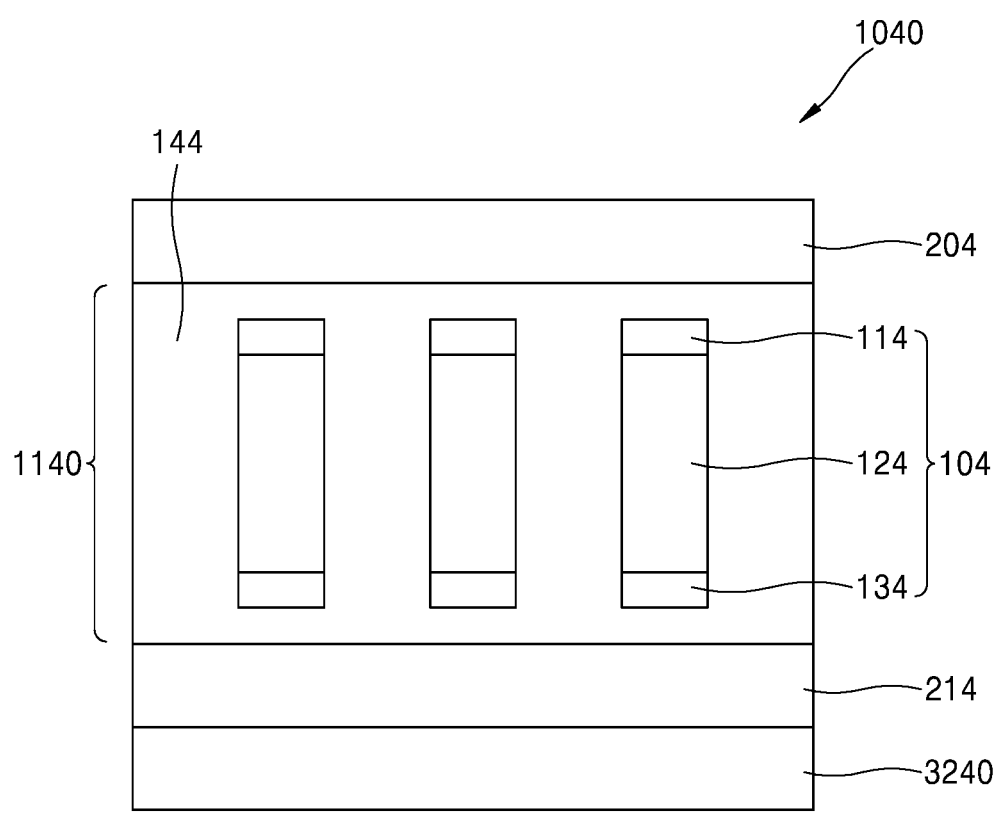
FIG. 12 is a lateral cross-sectional view schematically illustrating an optical filter element according to another example embodiment.

FIG. 12 is a lateral cross-sectional view schematically illustrating an optical filter element 1040 according to another embodiment.

Referring to FIG. 12, the optical filter element 1040 may be provided on a sensor 3240. The optical filter element 1040 may include a plurality of nano-columns 104 separated from each other in a horizontal direction and extended in a vertical direction. For example, the plurality of nano-columns 104 may be periodically arranged with a duty cycle with respect to each other in the horizontal direction. However, the disclosure is not limited thereto, and according to another example embodiment, the plurality of nano-columns 104 may be irregularly arranged. The plurality of nano-columns 104 may form a resonance layer 1140. A resonant wavelength of each of the plurality of nano-columns 104 may be determined by at least one of pitch, thickness, and duty cycle of the plurality of nano-columns 104. Each of the plurality of nano-columns 104 may include a first material layer 124 having an extinction coefficient and second material layers 114 and 134 having extinction coefficients different from that of the first material layer 122. The second material layers 114 and 134 may include an upper second material layer 114 and a lower second material layer 134. The upper and lower second material layers 114 and 134 respectively may be provided on upper and lower portions of the first material layer 124. The first material layer 124 may have a height greater than that of the upper and lower second material layers 114 and 134.

Also, the optical filter element 1040 may further include a first reflective layer 204 on the plurality of nano-columns 104 and a second reflective layer 214 under the plurality of nano-columns 104. Also, the optical filter element 1040 may further include a filling layer 144 that is provided between the first reflective layer 204 and the second reflective layer 214 to surround the plurality of nano-columns 104 and has a refractive index different from that of the plurality of nano-columns 104.

Also, the filling layer 144 may fill between upper surfaces of the plurality of nano-columns 104 and the first reflective layer 204 and between lower surfaces of the plurality of nano-columns 104 and the second reflective layer 214. Accordingly, the first and second reflective layers 204 and 214 may be separated from the plurality of nano-columns 104 in the vertical direction by the filling layer 144.

According to another example embodiment, one of the first and second reflective layers 204 and 214 may be separated from the plurality of nano-columns 104 in the vertical direction by the filling layer 144, while the filling layer 144 may not be provided between the other of the first and second reflective layers 204 and 214, and the plurality of nano-columns 104.

Figure 13:
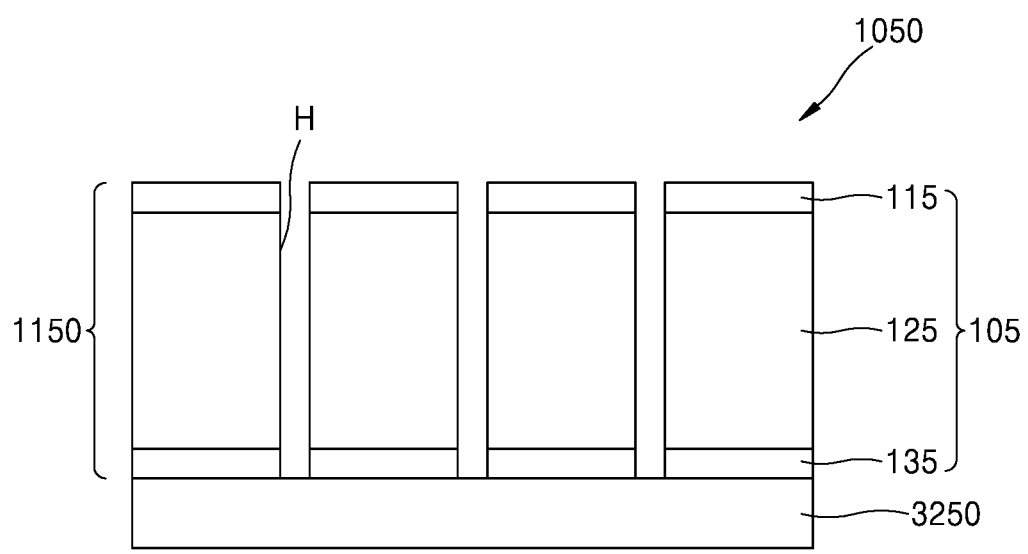
FIG. 13 is a lateral cross-sectional view schematically illustrating an optical filter element according to another example embodiment.
Figure 14:
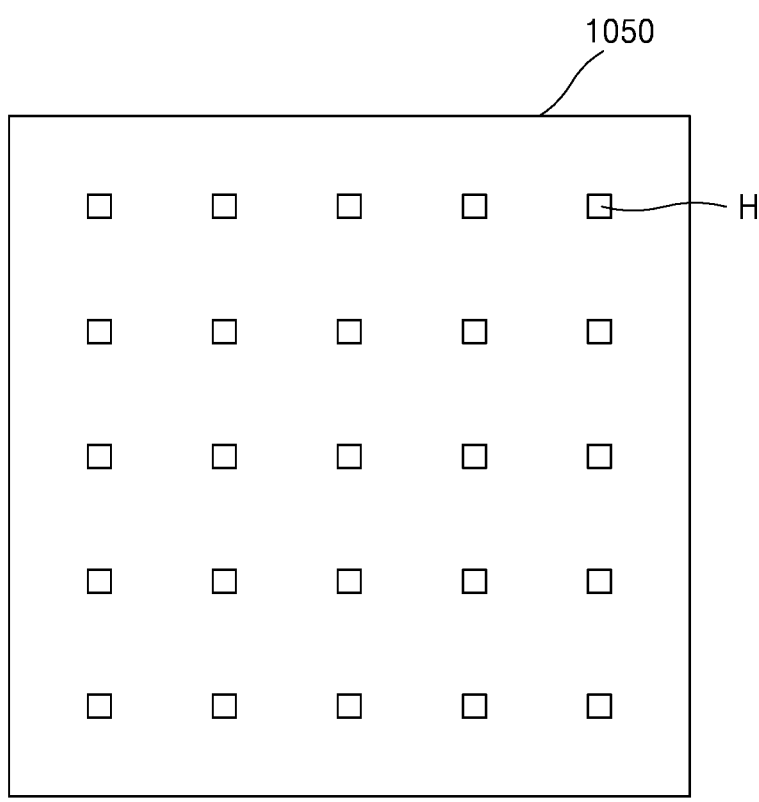
FIG. 14 is a plan view schematically illustrating the optical filter of FIG. 13.

FIG. 13 is a lateral cross-sectional view schematically illustrating an optical filter element 1050 according to another embodiment. FIG. 14 is a plan view schematically illustrating the optical filter element 1050 of FIG. 13.

Referring to FIG. 13, the optical filter element 1050 may be provided on a sensor 3250. The optical filter element 1050 may include a plurality of nano-columns 105 separated from each other in a horizontal direction and extended in a vertical direction. Portions of the plurality of nano-columns 105 may be connected to each other in the horizontal direction. For example, a plurality of holes H may be formed between the plurality of nano-columns 105. The plurality of nano-columns 105 may be separated from each other in the horizontal direction by the plurality of holes H. Regions where the holes H are not formed may be regions where the plurality of nano-columns 105 are connected to each other. As depicted in FIG. 14, when the optical filter element 1050 is viewed from above, the plurality of holes H may be periodically arranged. However, the disclosure is not limited thereto, and according to another example embodiment, the plurality of holes H may be non-periodically arranged. A resonant wavelength of the optical filter unit element may be determined by at least one of pitch, thickness, and duty cycle of the plurality of holes H.

Referring to FIG. 13, each of the plurality of nano-columns 105 may include a first material layer 125 having an extinction coefficient and second material layers 115 and 135 having extinction coefficients different from that of the first material layer 125. The second material layers 115 and 135 may include an upper second material layer 115 and a lower second material layer 135. The upper and lower second material layers 115 and 135 respectively may be provided on upper and lower portions of the first material layer 125. The first material layer 125 may have a height greater than that of the upper and lower second material layers 115 and 135.

The embodiments according to the disclosure may provide an ultra-small spectrometer having a broadband spectral range by including a resonance layer formed of nano-columns having a material layer absorbing light in a predetermined wavelength range.

It should be understood that example embodiments described herein should be considered in a descriptive sense only and not for purposes of limitation. Descriptions of features or aspects within each embodiment should typically be considered as available for other similar features or aspects in other embodiments. While one or more example embodiments have been described with reference to the figures, it will be understood by those of ordinary skill in the art that various changes in form and details may be made therein without departing from the spirit and scope as defined by the following claims.

What is claimed is:

1. An optical filter element comprising:
    a plurality of nano-columns separated from each other in a horizontal direction, wherein
    the plurality of nano-columns extend in a vertical direction, and
    each of the plurality of nano-columns comprises:
        a first material layer having a first extinction coefficient, and
        second material layers having a second extinction coefficient different from the first extinction coefficient of the first material layer,
    wherein the first material layer of each of plurality of nano-columns are separated from each other in the horizontal direction,
    wherein the first material layer has a refractive index less than that of the second material layers.

2. The optical filter element of claim 1, wherein each of the second material layers are provided on upper and lower portions of the first material layer.

3. The optical filter element of claim 2, further comprising a silicon oxide layer provided between the first material layer and the second material layer.

4. The optical filter element of claim 1, wherein the first extinction coefficient of the first material layer is less than the second extinction coefficient of the second material layers.

5. The optical filter element of claim 1, wherein the second coefficient of the second material layers is greater than 0.1.

6. The optical filter element of claim 5, wherein the second extinction coefficient of the second material layers is an extinction coefficient with respect to light in a wavelength range of 300 nm to 1000 nm.

7. The optical filter element of claim 1, wherein the second material layers comprise one of silicon Si or gallium arsenide GaAs.

8. The optical filter element of claim 1, wherein the first material layer comprises titanium oxide $TiO_2$.

9. The optical filter element of claim 1, wherein the first material layer has a first height greater than a second height of the second material layers.

10. The optical filter element of claim 1, wherein the second material layers have a height in a range of 10 nm to 20 nm.

11. The optical filter element of claim 1, wherein the first material layer has a height in a range of 50 nm to 200 nm.

12. The optical filter element of claim 1, wherein a resonant wavelength of the optical filter element is based at least one of pitch, thickness, and duty cycle of the plurality of nano-columns.

13. The optical filter element of claim 1, wherein the plurality of nano-columns are periodically arranged.

14. The optical filter element of claim 1, further comprising a filling layer that is provided to surround the plurality of nano-columns and has a first refractive index different from a second refractive of the plurality of nano-columns.

15. The optical filter element of claim 1, further comprising:
    a first reflective layer on the plurality of nano-columns; and
    a second reflective layer under the plurality of nano-columns.

16. The optical filter element of claim 15, wherein each of the first reflective layer and the second reflective layer comprises a stack-structure in which at least two material layers having different refractive indices from each other are alternately stacked.

17. The optical filter element of claim 1,
    wherein the first extinction coefficient represents light absorption characteristic of the first material layer, and
    wherein the second extinction coefficient represents light absorption characteristics of the second material layers.

18. A spectrometer comprising:
    a plurality of optical filter elements having different resonant wavelengths from each other; and
    a sensor configured to receive light transmitted through the plurality of optical filter elements, wherein
    each of the plurality of optical filter elements comprises:
        a plurality of nano-columns that are separated from each other in a horizontal direction,
        wherein the plurality of nano-columns extend in a vertical direction, and
        wherein each of the plurality of nano-columns comprises a first material layer having a first extinction coefficient and second material layers having second extinction coefficients different from the first extinction coefficient of the first material layer,
        wherein the first material layer of each of plurality of nano-columns are separated from each other in the horizontal direction,
        wherein the first material layer has a refractive index less than that of the second material layers.

19. The spectrometer of claim 18,
    wherein the first extinction coefficient represents light absorption characteristic of the first material layer, and
    wherein the second extinction coefficient represents light absorption characteristics of the second material layers.

20. The spectrometer of claim 18, wherein the plurality of optical filter elements are arranged in a two-dimensional (2D) array.

21. The spectrometer of claim 18, wherein each of the second material layers are provided on upper and lower portions of the first material layer.

22. The spectrometer of claim 18, wherein the second coefficient of the second material layer is greater than the first coefficient of the first material layer.

23. The spectrometer of claim 18, wherein the second coefficient of the second material layers is greater than 0.1.

24. The spectrometer of claim 18, further comprising:
    a first reflective layer provided on the plurality of nano-columns; and
    a second reflective layer provided under the plurality of nano-columns.

25. The spectrometer of claim 18, wherein each of the plurality of optical filter elements further comprises a filling layer that is provided to surround the plurality of nano-columns and has a first refractive index different from than a second refractive index of the plurality of nano-columns.

26. The spectrometer of claim 18, wherein the sensor comprises an image sensor or a photodiode.

27. A filter apparatus comprising:
a base layer;
a first refraction layer provided on the base layer, the first refraction layer having a first extinction coefficient, and the first refraction layer comprising a plurality of first columns separated from each other in a first direction;
a second refraction layer provided on the first refraction layer, the second refraction layer having a second extinction coefficient different from the first extinction coefficient, and the second refraction layer comprising a plurality of second columns separated from each other in the first direction; and
a third refraction layer provided on the second refraction layer, the third refraction layer having a third extinction coefficient different from the first extinction coefficient, and the third refraction layer comprising a plurality of third columns separated from each other in the first direction,
wherein the first refraction layer and the third refraction layer have a refractive index less than second refraction layer.

28. The filter apparatus of claim 27, wherein the second extinction coefficient is less than the first or the third extinction coefficient.

29. The filter apparatus of claim 27, wherein the base layer is a sensor layer.

* * * * *